(12) United States Patent
Jindra et al.

(10) Patent No.: US 6,528,104 B1
(45) Date of Patent: Mar. 4, 2003

(54) LOW WATER ACTIVITY FILLING

(75) Inventors: James A. Jindra, Wooster, OH (US); John P. Hansen, Wadsworth, OH (US)

(73) Assignee: The J. M. Smucker Company, Orrville, OH (US)

( * ) Notice: Subject to any disclaimer, the term of this patent is extended or adjusted under 35 U.S.C. 154(b) by 145 days.

(21) Appl. No.: 09/748,768

(22) Filed: Dec. 27, 2000

(51) Int. Cl.[7] .................. A23B 7/14; A23C 1/0522; A23C 1/064; A23L 1/302; A23L 1/304
(52) U.S. Cl. .................. 426/321; 426/72; 426/74; 426/250; 426/330.5; 426/333
(58) Field of Search .............. 426/321, 330.5, 426/333, 250, 72, 74

(56) References Cited

U.S. PATENT DOCUMENTS

| 4,774,095 A | 9/1988 | Kleinschmidt et al. |
| 5,059,433 A | 10/1991 | Lee et al. |
| 5,366,750 A | 11/1994 | Morano |
| 5,939,127 A | 8/1999 | Abboud |
| 6,146,672 A | * 11/2000 | Gonzalez et al. ............. 426/94 |

OTHER PUBLICATIONS

AC HUMKO Product Specifications: PS 12 Multi–Purpose Shortening, Apr. 1, 1998.
AC HUMKO Product Specifications: Dritex S Flakes, Apr. 1, 1998.

* cited by examiner

*Primary Examiner*—Helen Pratt
(74) *Attorney, Agent, or Firm*—Fay, Sharpe Fagan, Minnich & McKee

(57) ABSTRACT

A flavored filling having a low water activity. The filling includes a flavoring agent, an edible oil, and humectant. The edible oil can include a high and a low melting temperature oil. The high melting point oil, when used, can act as a crystal seeding agent during the formation of the filling.

49 Claims, 6 Drawing Sheets

$A_{W_2} << A_{W_1}$
$A_{W_2} << A_{W_3}$

LOW WATER ACTIVITY FILLING

The subject invention relates generally to an improved filling, and more particularly to a low water activity fruit filling for use in a food product.

BACKGROUND OF THE INVENTION

Filled food products, such as pies, cakes, waffles, donuts, candies, cereal bars, and the like are commonly filled with various types of flavored fillings such as fruit fillings, marshmallow fillings, peanut putter fillings, vegetable fillings, and the like. These food products are commonly prepackaged for later use by the consumer. The process for filling the food product, packaging the food product and imparting adequate shelf-life to the food product has presented numerous problems relating to food product quality. One such problem is the introduction and retention of high flavoring of the filling. To provide high flavoring and other qualities, such as pleasing mouth feel, the flavored filling traditionally needed to be formulated with a high water content. While the high water content provides pleasing qualities to the consumer, it also causes stability problems for the filled food product. One such problem is the migration of water from the filling material into the casing material of the filled food product. The area of surface contact between the two materials provides a potential for instability between the two materials leading to chemical reactions that can cause the degradation of the food product. Water migration also can cause the casing material to become soggy and the filling material to lose its flavoring, each of which reduces the overall satisfaction of the consumer.

One method for preventing the degradation of the filled food product due to water migration is disclosed in U.S. Pat. No. 4,623,542. The '542 patent discloses the use of a dough and a roll-in shortening laminated pad to prevent the migration of water from the filling material to the casing material. Additionally, the filling material is formulated to act as a moisture sink while cooking the filled food product in preparation for storage.

Another method for preventing the migration of water has been simply to reduce the water content of both the filling material and the casing material and/or to maintain the water activity of the filling to be less than or equal to the casing material. The lower water content of the filling and/or casing material reduces the amount of free water in the food product thereby reducing the amount of water that is capable of migrating between the filling material and the casing material. However, the lack of water in the filled food product also reduces the overall flavor and mouth-feel and eating quality resulting in reduced consumer satisfaction. The following is an example of typical water activities for a variety of high solids fillings and confections:

| Filling | Water Activity |
| --- | --- |
| Crème Cookie Filling | 0.535 |
| Peanut Butter Pecan Cookie Filling | 0.552 |
| Fudge Cookie Filling | 0.421 |
| Mint Confection Filling | 0.661 |
| Caramel Crème Filling | 0.538 |
| Gelatin Gummis | 0.666 |
| Caramels | 0.567 |
| Circus Peanuts | 0.641 |

-continued

| Filling | Water Activity |
| --- | --- |
| Cereal Bar Fruit Filling | 0.660 |
| Strawberry Fruit Filling | 0.805 |

Typical fruit fillings have water activities of 0.60 or greater. Fruit fillings that have lower water activities generally have a rubbery, grainy texture with poor flavor release and eating characteristics. The typical method for achieving a lower water activity primarily relies on increasing solids at the expense of moisture. Lowering the water activity in this manner frequently results in a fruit filling with poor flavor release, poor textural and poor rheological attributes. In addition, low water activity fruit fillings typically have excessive viscosity development during the manufacture of the fruit filling thus making it difficult to incorporate dry ingredients. Often, additional moisture must be added to the fruit filling to provide a fluid matrix in which the dry ingredients can be either dispersed or dissolved. This requires that the moisture be removed at some later step (i.e., using vacuum and heat) if the final low water activity is to be achieved. The rheological characteristics of a low water activity fruit filling also makes it more difficult to pump and/or extrude the fruit filling for packaging and/or insertion in a final food product.

The maintaining of the water activity of the filling so as to not be greater than the food casing material reduces the tendency of the water in the filling to migrate to the case material. However, many types of fillings, especially fruit fillings, need to have a high water activity to obtain the desired overall flavor and mouth feel associated with the fruit filling. Such high water activities of the filling resulted in poor quality and unstable food casings when the water activity of the food casing is raised so as to be equal or greater than the water activity of the filling. As a result the shelf life and quality of the filling food product was reduced.

Therefore, it would be desirable to develop a filled food product having a filling with a low water activity and which filling has desirable organoleptic characteristics and which can be manipulated both in manufacture and during end use.

SUMMARY OF THE INVENTION

The invention relates to a low water activity food product and more particularly to a low water activity filling for use as a filling for a food product. The filling can be a fruit filling or a filling that includes substantially little or no fruit. The filling is formulated to have a high solids content and a low water activity. The solids content of the filling typically constitutes a majority of the filling. The water activity of the filling is generally selected so as to reduce the amount of moisture transfer to a food casing. The filling is formulated to maintain the sweetness, flavor and other desired organoleptic characteristics while maintaining a low water activity. The viscosity of the filling is such that the filling can be pumped, extruded and/or otherwise deposited on and/or in a food casing in a manner similar to fillings with higher water activities.

In one aspect of the present invention, the water activity of the filling is sufficiently low to reduce or substantially prevent moisture migration from the filling to a food casing. In one embodiment, the water activity ($A_w$) of the filling is less than or equal to the water activity of the finished food casing. In one aspect of this embodiment, the water activity of the filling is less than the water activity of a food casing generally made from a dough or butter comprised at least partially of flour. Typically the flour includes, but is not limited to, all-purpose flour, hard wheat flour, soft wheat flour, whole wheat flour, corn flour, oat flour, rice flour, and/or barley flour. Food products that have food casing made from flour include, but are not limited to, pies, cakes, cup cakes, strudels, cobblers, bagels, breads, crepes, toast, tarts, pancakes, waffles, muffins, cookies, crackers, pastries, donuts, crusts, granola bars, cereal bars, biscuits, turnovers, pizzas, pot pie, pasta, burritos, and calzones. In one specific aspect of this embodiment, the water activity of the filling when used in food casings including flour is less than about 0.8. In another specific aspect of this embodiment, the water activity of the filling when used in food casings including flour is less than about 0.7. In still another specific aspect of this embodiment, the water activity of the filling when used in food casings including flour is less than about 0.65. In yet another specific aspect of this embodiment, the water activity of the filling when used in food casings including flour is less than about 0.6. In still yet another specific aspect of this embodiment, the water activity of the filling when used in food casings including flour is less than about 0.5. In a further specific aspect of this embodiment, the water activity of the filling when used in food casings including flour is less than about 0.4. In still a further specific aspect of this embodiment, the water activity of the filling when used in food casing made of flour is less than about 0.35. In yet a further specific aspect of this embodiment, the water activity of the filling when used in food casing made of flour is less than about 0.3. In still yet a further specific aspect of this embodiment, the water activity of the filling when used in food casing made of flour is less than about 0.25. In another specific aspect of this embodiment, the water activity of the filling when used in food casing made of flour is less than about 0.2. In another embodiment, the filling has a water activity that is sufficiently low so as to increase the shelf life of the food product.

Fillings are commonly inserted into various types of candies and chocolates. Fillings such as fruit fillings, caramel fillings, cream fillings, marshmallow fillings and the like, are commonly encased in a candy or chocolate coating. In one specific aspect of this embodiment, the water activity of the filling when used in candies and chocolates is less than about 0.95. In another specific aspect of this embodiment, the water activity of the filling when used in candies and chocolates is less than about 0.85. In still another specific aspect of this embodiment, the water activity of the filling when used in candies and chocolates is less than about 0.8. In yet another specific aspect of this embodiment, the water activity of the filling when used in candies and chocolates is less than about 0.7. In still yet another specific aspect of this embodiment, the water activity of the filling when used in candies and chocolates is less than about 0.6. In a further specific aspect of this embodiment, the water activity of the filling when used in candies and chocolates is less than about 0.5. In yet a further specific aspect of this embodiment, the water activity of the filling when used in candies and chocolates is less than about 0.4. In still a further specific aspect of this embodiment, the water activity of the filling when used in candies and chocolates is less than about 0.35. In yet a further specific aspect of this embodiment, the water activity of the filling when used in candies and chocolates is less than about 0.3. In still yet a further specific aspect of this embodiment, the water activity of the filling when used in candies and chocolates is less than about 0.25. In another specific aspect of this embodiment, the water activity of the filling when used in candies and chocolates is less than about 0.2.

In another aspect of the invention, the filling includes a combination of edible oil and humectant to achieve the low water activity of the filling. The edible oil and the humectant are, in one sense, used as a partial or full substitute for water in the filling, thus enabling the filling to be formulated with a low water activity. The edible oil and humectant also function to fluidize and plasticize the filling thereby facilitating in dispersing other components of the filling when added to the filling during the manufacturing of the filling. The edible oil and humectant further facilitate in the filling being easily processed (i.e pumped, stirred, mixed, extruded, etc.) during the manufacturing of the filling. The edible oil and humectant still further facilitate in the filling being easily pumped, extruded or otherwise deposited on and/or in a food casing or directed into packaging for later use. The oil also functions as a high temperature stabilizing agent for the filling when the final filling is exposed to temperatures above ambient temperature. The humectant also functions to bind the components of the filling together. In one embodiment, the humectant includes, but is not limited to, glycerine, 1,3-butyl glycol, mannitol, sorbitol, fructose, and/or propylene glycol. In one aspect of this embodiment, the humectant includes glycerin. In another aspect of this embodiment, the humectant includes propylene glycol. In another embodiment, the humectant constitutes less than a majority weight percent of the final filling. In one aspect of this embodiment, the humectant constitutes up to about 40 weight percent of the final filling. In another aspect of this embodiment, the humectant constitutes at least about 0.1 weight percent of the final filling. In yet another aspect of this embodiment, the humectant constitutes about 0.1–40 weight percent of the final filling. In still another aspect of this embodiment, the humectant constitutes about 0.1–30 weight percent of the final filling. In still yet another aspect of this embodiment, the humectant constitutes about 1–30 weight percent of the final filling. In a further aspect of this embodiment, the humectant constitutes about 10–25 weight percent of the final filling. In yet another embodiment, the edible oil includes natural, hydrogenated, and/or partially hydrogenated oils. The source of the edible oil includes, but is not limited to, soybean, cottonseed, canola, rapeseed, peanut, safflower, sunflower, coconut, palm, palm kernel, olive, butterfat, cocoa butter, tallow, lard, and/or corn. In still yet another embodiment, the edible oil constitutes up to 80 weight percent of the final filling. In one aspect of this embodiment, the edible oil constitutes up to about 60 weight percent of the final filling. In another aspect of this embodiment, the edible oil constitutes up to about 50 weight percent of the final filling. In yet another aspect of this embodiment, the edible oil constitutes at least about 0.01 weight percent of the final filling. In still another aspect of this embodiment, the edible oil constitutes about 0.01–50 weight percent of the final filling. In still yet another aspect of this embodiment, the edible oil constitutes up to about 40 weight percent of the final filling. In a further aspect of this embodiment, the edible oil constitutes about 0.01–30 weight percent of the final filling. In yet a further aspect of this embodiment, the edible oil constitutes about 5–30 weight percent of the final filling. In still yet a further aspect of this embodiment, the edible oil constitutes about 10–25 weight percent of the final filling.

In still another aspect of the invention, the filling includes a combination of at least two edible oils wherein at least one edible oil is a low melting point oil and at least one edible oil is a high melting point oil. The low melting point oil and high melting point oil are manipulated in the filling to cause the filling to have a substantially smooth texture and flowable composition, and to maintain such characteristics even when the filling is heated. The high melting point oil is used as a crystal seeding substance to cause crystals to grow as the filling is cooled during the manufacturing of the filling and can be used also to adjust the melting point and setting time of the filling. The high melting point oil also functions as a stabilizing agent to the final filling when the final filling is exposed to higher temperatures. The high melting point oil can constitute one or more edible oils and can include a composition of triglycerides, diglycerides, or monoglycerides or any mixture thereof. The low melting point oil can also constitute one or more edible oils. Each high melting point oil has an average melting point temperature that is greater than the average melting point of the low melting point oil. In one embodiment, the average melting point temperature of the high melting point oil is at least about 5° F. above the average melting point temperature of the low melting point oil. In one aspect of this embodiment, the average melting point temperature of the high melting point oil is at least about 10° F. above the average melting point temperature of the low melting point oil. In another aspect of this embodiment, the average melting point temperature of the high melting point oil is at least about 20° F. above the average melting point temperature of the low melting point oil. In still another aspect of this embodiment, the average melting point temperature of the high melting point oil is at least about 30° F. above the average melting point temperature of the low melting point oil. In still yet another aspect of this embodiment, the average melting point temperature of the high melting point oil is at least about 40° F. above the average melting point temperature of the low melting point oil. In still another embodiment, the average melting point temperature of the high melting point oil greater than about 110° F. In one aspect of this embodiment, the average melting point temperature of the high melting point oil is greater than about 140° F. In another aspect of this embodiment, the average melting point temperature of the high melting point oil is about 130–200° F. In still another aspect of this embodiment, the average melting point temperature of the high melting point oil is about 133–180° F. In still yet another aspect of this embodiment, the average melting point temperature of the high melting point oil is about 133–160° F. In yet another aspect of this embodiment, the high melting point oil includes, but is not limited to, a soybean based edible oil sold under the trade name Dritex S Flakes by AC Humko. In yet another embodiment, the average melting point temperature of the low melting point oil is up to about 120° F. In one aspect of this embodiment, the average melting point temperature of the low melting point oil is about 60–110° F. In another aspect of this embodiment, the low melting point oil includes, but is not limited to, a soybean based edible oil sold under the trade name PS 12 by AC Humko. In still yet another embodiment, the weight percentage of the low melting point oil in the final filling is greater than the weight percentage of the high melting point oil in the final filling. In one aspect of this embodiment, the weight percentage of the low melting point oil is at least two times greater than the weight percentage of the high melting point oil in the final filling. In another aspect of this embodiment, the weight percentage of the low melting point oil is at least three times greater than the weight percentage of the high melting point oil in the final filling. In still another aspect of this embodiment, the weight percentage of the low melting point oil is at least five times greater than the weight percentage of the high melting point oil in the final filling. In yet another aspect of this embodiment, the weight percentage of the low melting point oil is at least ten times greater than the weight percentage of the high melting point oil in the final filling. In still another embodiment, the high melting point oil is up to about 30 weight percent of the final filling. In one aspect of this embodiment, the high melting point oil is about 0.01–30 weight percent of the final filling. In another aspect of this embodiment, the high melting point oil is about 0.01–20 weight percent of the final filling. In yet another aspect of this embodiment, the high melting point oil is about 0.01–10 weight percent of the final filling. In still another aspect of this embodiment, the high melting point oil is about 0.05–5 weight percent of the final filling. In still yet another aspect of this embodiment, the high melting point oil is about 0.05–2 weight percent of the final filling. In a further aspect of this embodiment, the high melting point oil is about 0.5–1.5 weight percent of the final filling. In still yet another embodiment, the low melting point oil is up to about 60 weight percent of the final filling. In one aspect of this embodiment, the low melting point oil is up to about 50 weight percent of the final filling. In another aspect of this embodiment, the low melting point oil is about 5–25 weight percent of the final filling. In still another aspect of this embodiment, the low melting point oil is about 10–25 weight percent of the final filling. In still yet another aspect of this embodiment, the low melting point oil is about 15–25 weight percent of the final filling. In a further aspect of this embodiment, the low melting point oil is about 15–22 weight percent of the final filling.

In still another aspect of the invention, the filling is a fruit filling that includes natural and/or artificial fruit. Many types of fruit and/or combinations of fruit can be used in the filling. The fruit source includes, but is not limited to, fruit puree, fruit puree concentrate, fruit juice, fruit juice concentrate, fruit pieces, fruit concentrate, dried fruit, dehydrated fruit, fruit flakes, fruit powder, fruit extract, fruit flavored oils, artificial fruit, artificial fruit concentrate, and mixtures thereof. Examples of a few of the many specific fruits which can be utilized in the filling include, but are not limited to, berries of all types, currants, apricots, peaches, nectarines, plums, cherries, apples, pears, oranges, grapefruits, lemons, limes, tangerines, mandarins, tangelos, bananas, pineapples, grapes, tomatoes, rhubarbs, prunes, figs, pomegranates, passion fruit, guava, kiwi, kumquat, mangos, avocados, all types of melons, and/or papaya. In one embodiment, dried fruit flakes are included in the filling. Fruit flakes are a desirable vehicle when adding fruit to a filling. Fruit flakes contain little water, thus do not cause the water activity of the final filling to substantially increase. In one aspect of this embodiment, the fruit flakes are the primary source of fruit in the filling. In another aspect of this embodiment, fruit flakes are combined with one or more fruit sources to provide the fruit content of the filling. In another embodiment, the fruit content of the final filling constitutes up to a majority of the filling. In one aspect of this embodiment, the fruit content of the final filling constitutes up to about 40 weight percent of the filling. In another aspect of this embodiment, the fruit content of the final filling constitutes at least about 0.05 weight percent of the filling. In still another aspect of this embodiment, the fruit content of the final filling constitutes up to about 30 weight percent of the filling. In yet another aspect of this embodiment, the fruit content of the final filling constitutes about 0.1–30 weight percent of the filling. In a further aspect of this embodiment, the fruit content of the final filling constitutes about 1–25 weight percent of the filling. In still a further aspect of this embodiment, the fruit content of the final filling constitutes about 5–20 weight percent of the filling. In yet a further aspect of this embodiment, the fruit content of the final filling constitutes about 10–20 weight percent of the filling. In still yet a further aspect of this embodiment, the fruit content of the final filling constitutes about 12–20 weight percent of the filling.

In yet another aspect of this invention, the filling is a non-fruit filling. Such fillings include, but are not limited to, chocolate fillings, marshmallow fillings, vanilla fillings, nut fillings, peanut butter fillings, caramel fillings, cream fillings, and the like. In one embodiment, the flavoring component of the non-fruit filling constitutes up to about 30 weight percent of the filling. In one aspect of this embodiment, the flavoring component constitutes about 0.01–25 weight percent of the filling. In another aspect of this embodiment, the flavoring component constitutes about 0.1–20 weight percent of the filling. In yet another aspect of this embodiment, the flavoring component constitutes about 0.1–10 weight percent of the filling. In still another aspect of this embodiment, the flavoring component constitutes about 0.1–5 weight percent of the filling.

In still yet another aspect of the invention, the filling includes a sweetener. The sweetener enhances the flavor of the final filling. The sweetener also modifies the fluidity of the filling during manufacture of the filling and after the final filling is formed. The sweetener can include, but is not limited to, sucrose, dextrose, fructose, lactose, malt syrup, malt syrup solids, rice syrup, rice syrup solids, invert sugar, refiners syrup, corn syrup, corn syrup solids, maltose, high fructose corn syrup, fructose syrup, honey, molasses, grain syrups, agave, and/or artificial sweeteners (aspartame, sucralose, saccharin). In one embodiment, the sweetener includes syrup, honey, and/or molasses. The syrup, honey, and/or molasses add sweetness to the filling, add some water to the filling, and provide fluidity to the filling to enable other components of the filling to be mixed together during manufacture of the filling and/or facilitate in the pumping and/or extruding of the final filling into packaging and/or in the final food product. In another embodiment, the sweetener includes dried and/or powdered sweetener. The powdered and/or dried sweetener adds sweetness to the final filling; however, such sweetener adds little or no water to the filling, thus does not cause an increase in the water activity of the final filling. In still another embodiment, non-powdered and/or non-dried sweetener and powdered and/or dried sweetener are added to the final filling. In yet another embodiment, the sweetener constitutes up to a majority of the final filling. In one aspect of this embodiment, the sweetener constitutes up to about 80 weight percent of the final filling. In another aspect of this embodiment, the sweetener constitutes at least about one weight percent of the final filling. In yet another aspect of this embodiment, the sweetener constitutes up to about 50 weight percent of the final filling. In still another aspect of this embodiment, the sweetener constitutes about 10–50 weight percent of the final filling. In still yet another aspect of this embodiment, the sweetener constitutes about 30–50 weight percent of the final filling. In still a further aspect of this embodiment, the sweetener constitutes about 30–45 weight percent of the final filling.

In a further aspect of the invention, the filling includes a starch. The starch is added as a thickening agent, a body forming agent to the filling, a stabilizer for the filling, and/or organoleptic characteristic enhancer of the final filling. The starch content of the filling can be adjusted to dictate the consistency and texture of the filling. As with the addition of the sweetener to the filling, the addition of starch to the filling modifies the processability of the filling without the need to add significant amounts of water to the filling. The starch can include, but is not limited to, flours, natural or modified starches, corn, waxy corn, rice, wheat, tapioca, potato, arrowroot, maize, and/or oat. In one embodiment, an instant granular modified starch that is hydrateable by water into a highly viscose free standing mass is included in the filling. One type of instant granular modified starch that can be used in the filling is a modified corn starch sold under the trademark MIRA-THIK by A. E. Staley Manufacturing Company. In another embodiment, an instant granular starch hydrateable by water to form a resilient, colloidal gel structure is included in the filling. One type of instant granular starch that can be used in the filling is a natural instant granular corn starch sold under the trademark MIRA-GEL by A. E. Staley Manufacturing Company. In still another embodiment, the starch content of the final filling is up to about 15 weight percent. In one aspect of this embodiment, the starch content is about 0.01–15 weight percent of the final filling. In another aspect of this embodiment, the starch content is about 0.1–5 weight percent of the final filling. In yet another aspect of this embodiment, the starch content is about 0.1–4 weight percent of the final filling.

In still a further aspect of the invention, the filling includes an emulsifier. The emulsifier modifies and stabilizes the crystallization of the edible oil in the filling when the filling is cooled. Specifically, the emulsifier delays the formation of crystals and/or helps stabilize the formed crystals during the cooling of the filling. The emulsifier includes, but is not limited to, lecithin, glycerol esters, diacetyl tartaric acids, esters of monoglycerides, mono and di-glycerides, polyglycerol esters, polysorbate, propylene glycol esters, rice extract esters, sodium stearoyl-2-lactylate, sorbitan esters, sugar esters, and/or acetylated monoglycerides. In one embodiment, the lecithin content of the final filling is up to about 10 weight percent. In one aspect of this embodiment, the lecithin constitutes up to about 5 weight percent of the final filling. In another aspect of this embodiment, the lecithin constitutes about 0.01–5 weight percent of the final filling. In still another aspect of this embodiment, the lecithin constitutes about 0.05–2 weight percent of the final filling. In yet another aspect of this embodiment, the lecithin constitutes about 0.05–1 weight percent of the final filling. In still yet another aspect of this embodiment, the lecithin constitutes about 0.1–1 weight percent of the final filling.

In still yet a further aspect of the invention, the filling includes one or more additional components to alter the flavor, color, shelf life, and/or organoleptic characteristics of the filling. The additional components include, but are not limited to, natural and/or artificial flavorings, acidulants, coloring agents, stabilizers, salt, antimicrobial preservatives, vitamins, minerals, and/or antioxidant preservatives. One or more of these additional components are used to increase the shelf life of the filling, improve the nutritional value of the filling, improve the taste of the filling, alter and/or improve the appearance of the filling, and/or improve one or more organoleptic characteristics of the filling. When natural and/or artificial flavorings are included in the filling, the natural and/or artificial flavorings include artificial fruit, artificial fruit concentrate, natural fruit, natural fruit concentrate, artificial vegetable, artificial vegetable concentrate, natural vegetable, natural vegetable concentrate, fruit extract, vegetable extract, cocoa, caramel, caramel powder, maple syrup, spices, herbs, and/or flavored oils. As can be appreciated, other natural and/or artificial flavorings can be alternatively or additionally used in the filling. When natural fruit and/or natural fruit concentrate are used as a flavoring agent, the weight percentage of the natural fruit and/or natural fruit concentrate is included in the weight percentage of the fruit used in the filling. Similarly, when natural vegetable and/or natural vegetable concentrate are used as a flavoring agent, the weight percentage of the natural vegetable and/or natural vegetable concentrate is included in the weight percentage of the vegetable used in the filling. In one embodiment, the natural and/or artificial flavoring, when added to the filling, constitutes at least about 0.01 weight percent of the final filling. In one aspect of this embodiment, the natural and/or artificial flavoring constitutes up to about 30 weight percent of the final filling. In another aspect of this embodiment, the natural and/or artificial flavoring constitutes up to about 20 weight percent of the final filling. In yet another aspect of this embodiment, the natural and/or artificial flavoring constitutes about 0.01–20 weight percent of the final filling. In still another aspect of this embodiment, the natural and/or artificial flavoring constitutes about 0.01–20 weight percent of the final filling. In still yet another aspect of this embodiment, the natural and/or artificial flavoring constitutes about 0.01–5 weight percent of the final filling. In a further aspect of this embodiment, the natural and/or artificial flavoring constitutes about 0.1–2 weight percent of the final filling. When one or more acidulants are included in the filling, the acidulant generally includes citric acid, malic acid, tartaric acid, lactic acid, acetic acid, phosphoric acid, adipic acid, glucono delta lactone acid, fumaric acid, succinic acid, tannic acid, folic acid, ascorbic acid, and/or pantothenic acid. As can be appreciated other acidulants can be alternatively or additionally used in the filling. In one embodiment, the acidulant, when added to the filling, constitutes at least about 0.01 weight percent of the final filling. In one aspect of this embodiment, the acidulant constitutes up to about 10 weight percent of the final filling. In another aspect of this embodiment, the acidulant constitutes up to about 5 weight percent of the final filling. In yet another aspect of this embodiment, the acidulant constitutes about 0.01–5 weight percent of the final filling. In still another aspect of this embodiment, the acidulant constitutes about 0.05–5 weight percent of the final filling. In still yet another aspect of this embodiment, the acidulant constitutes about 0.1–1.5 weight percent of the final filling. In a further aspect of this embodiment, the acidulant constitutes about 0.1–1 weight percent of the final filling. When one or more coloring agents are included in the filling, coloring agents generally includes natural and/or artificial coloring agents. The coloring agents include coal tar dyes, aluminum lake insoluble coal tar dyes, concentrated or dry forms of grape skin extracts, titanium oxide, grape concentrate, purple carrot concentrate, fruit extracts, fruit juice concentrates, vegetable extracts, vegetable juice concentrates, beet, carmine, cochineal extracts, annatto, paprika, tumeric, beta carotene, purple potato, and/or radish. As can be appreciated other coloring agents can be alternatively or additionally used in the filling. In one embodiment, the coloring agent, when added to the filling, constitutes at least about 0.005 weight percent of the final filling. In one aspect of this embodiment, the coloring agent constitutes up to about 5 weight percent of the final filling. In another aspect of this embodiment, the coloring agent constitutes up to about 2 weight percent of the final filling. In yet another aspect of this embodiment, the coloring agent constitutes about 0.01–1 weight percent of the final filling. Fillings made to water activity levels of 0.7 or 0.6 and below are generally considered microbiologically stable. If the filling is in risk of being subjected to water, antimicrobial preservatives can be added to control microbiological growth. When one or more antimicrobial preservatives are included in the filling, antimicrobial preservatives generally include sodium benzoate, potassium sorbate. As can be appreciated other antimicrobial preservatives can be alternatively or additionally used in the filling. In one embodiment, the antimicrobial preservative, when added to the filling, constitutes up to about 2 weight percent of the final filling. In one aspect of this embodiment, the antimicrobial preservative constitutes up to about 0.5 weight percent of the final filling. In another aspect of this embodiment, the antimicrobial preservative constitutes at least about 0.005 weight percent of the final filling. When one or more vitamins and/or minerals are included in the filling, vitamins and/or minerals generally include ascorbic acid, beta carotene, biotin, calcium pantothenate, choline, folic acid, niacin, vitamin A, vitamin $B_1$, vitamin $B_2$, vitamin $B_6$, vitamin $B_{12}$, vitamin $D_2$, vitamin $D_3$, niacinamide, vitamin E, vitamin K, boron, calcium, chromium, copper, iodine, iron, magnesium, molybdenum, nickel, potassium, selenium, vanadium, and/or zinc As can be appreciated other vitamins and minerals can be alternatively or additionally used in the filling. In one embodiment, the vitamin and/or mineral preservatives, when added to the filling, constitute up to about 5 weight percent of the final filling. In one aspect of this embodiment, the vitamins and/or minerals constitute up to about 2 weight percent of the final filling. In another aspect of this embodiment, the vitamins and/or minerals constitute at least about 0.1 weight percent of the final filling. When one or more salts are included in the filling, salt generally includes potassium chloride and/or calcium chloride. As can be appreciated, other salts can be alternatively or additionally used in the filling. In one embodiment, the salt, when added to the filling, constitutes up to about 2 weight percent of the final filling. In one aspect of this embodiment, the salt constitutes up to about 1 weight percent of the final filling. In another aspect of this embodiment, the salt constitutes at least about 0.05 weight percent of the final filling. When one or more stabilizers are included in the filling, the stabilizer generally includes cellulose, cellulose gel, cellulose gum, pectin, seaweed, xanthan gum, carrageenan, an alginate, cellulosegums, modified starches, gelatin and/or maltodextrins. The cellulose, cellulose gel, cellulose gum, and xanthin gum are chosen from, but are not limited to, pectin, guar, locust bean, tara, gellan, alginate, tragacanth, karaya, Ghatti, agar, seaweed, gelatin, arabic, acacia, carrageenan, carboxmethylcellulose, and/or hydropropylmethocellulose gum. As can be appreciated, other-stabilizers can be alternatively or additionally used in the filling. In one embodiment, the stabilizer, when added to the filling, constitutes up to about 2 weight percent of the final filling. In one aspect of this embodiment, the stabilizer constitutes up to about 1 weight percent of the final filling. In another aspect of this embodiment, the stabilizer constitutes at least about 0.01 weight percent of the final filling. When antioxidant preservatives are included in the filling, antioxidant preservatives generally include BHA, BHT and/or TBHQ. As can be appreciated, other antioxidant preservatives can be alternatively or additionally used in the filling. The antioxidant preservatives can be added to increase shelf life of the filling. In one embodiment, the antioxidant preservative, when added to the filling, constitutes at least about 0.001 weight percent of the final filling. In one aspect of this embodiment, the antioxidant preservative constitutes up to about 2 weight percent of the final filling. In another aspect of this embodiment, the antioxidant preservative constitutes up to about 0.01–1 weight percent of the final filling. In still another aspect of this embodiment, the antioxidant preservative constitutes up to about 0.01–0.5 weight percent of the final filling.

In another aspect of the present invention, the water content of the final filling is sufficiently low so as to control the water activity of the final filling. In one embodiment of the invention, the water content of the final filling is less than about 25 weight percent. In one aspect of this embodiment, the water content of the final filling is less than about 15 weight percent. In another aspect of this embodiment, the water content of the final filling is less than about 10 weight percent. In still another aspect of this embodiment, the water content of the final filling is less than about 6 weight percent. In yet another aspect of this embodiment, the water content of the final filling is less than about 5.5 weight percent. In still yet another aspect of this embodiment, the water content of the final filling is less than about 5 weight percent.

In still another aspect of the invention, the filling is formed by a novel process to achieve the low water activity of the filling and maintain the desired organoleptic characteristics of the filling that are commonly associated with fillings having higher water activities. The novel process involves the controlling of the size and type of fat crystals in the final filling. The size and type of fat crystals is maintained so as to form a crystalline network or structure that prevents settling of solids, thus maintaining a more homogeneous structure, prevents oil separation, provides desirable consistency by reducing the granular texture and granular taste of the final filling. The size and type of fat crystals is maintained so that the filling can be pumped, poured and/or extruded into packaging for later use, inserted into a food casing and/or applied to the surface of a food product. The novel process also controls the temperature at which the final food product is pumped, poured and/or extruded into packaging for later use, inserted into a food casing and/or applied to the surface of a food product. By controlling the fat crystal size and type in the final filling and the temperature at which the final filling is packaged or applied to another food product, a high quality filling is formed having low water activity and desired organoleptic characteristics. When manufacturing the filling, the one or more edible oils used in the filling are substantially fully melted. Typically, the temperature of the one or more oils is maintained at least about 5° F. above the melting point of the highest melting point edible oil included in the filling. After the one or more edible oils are melted, humectant is added to the melted oil or oils. The humectant is substantially fully dispersed in the one or more oils. Typically, high shear mixing is used to disperse the humectant in the one or more oils; however, the humectant can be dispersed in other ways. The temperature of the oil and humectant mixture is maintained sufficiently high to prevent or minimize the solidification and/or crystallization of the one or more oils until the humectant is dispersed in the one or more oils. In one embodiment, the temperature is maintained above about 140° F. If fruit solids, sweetener, lecithin, acidulant, starch, coloring agent, natural and/or artificial flavoring are to be added to the filling, such components are added to and substantially fully dispersed in the one or more oils prior to the substantial solidification and/or crystallization of the one or more oils. Typically, high shear mixing is used to disperse the fruit solids, sweetener, lecithin, acidulant, starch, coloring agent, and/or natural and/or artificial flavoring in the one or more oils; however, the fruit solids, sweetener, lecithin, acidulant, starch, coloring agent, and/or natural and/or artificial flavoring can be dispersed in other ways. As can be appreciated, the humectant, fruit solids, sweetener, lecithin, acidulant, starch, coloring agent, and/or natural and/or artificial flavoring can be added together, separately, or in various combinations when dispersing such components in the one or more oils. Once the oil, humectant and fruit solids, sweetener, lecithin, acidulant, starch, coloring agent, and/or natural and/or artificial flavoring are mixed together, the temperature of the mixture is reduced to cause one or more of the oils to begin to crystallize. In one embodiment, the temperature is maintained between about 80–160° F. When a higher melting point oil is included in the filling, the higher melting point oil acts as a seeding agent for crystallization of one or more of the other components in the mixture such as, but not limited to, one or more other oils in the mixture. During this initial crystallization process, the mixture is typically slowly mixed to maintain the dispersion of the components in the mixture. As the mixture is further cooled, fat crystal growth in the mixture continues, resulting in the formation and increase in quantity of crystals in the filling. The size of the crystals and resulting crystalline network are reduced by breaking or fracturing the crystals as the mixture is cooled. The crystal size and crystalline network can be reduced in a number of different manners. One particular method is by subjecting the mixture to a scraped surface heat exchanger or votator to simultaneously break the crystals as the mixture is being cooled. In another embodiment, the temperature of the final filling after being cooled is about 50–120° F. In one aspect of this embodiment, the crystals in the mixture are reduced until the temperature of the filling is about 60–115° F. In another aspect of this embodiment, the crystals in the mixture are reduced until the temperature of the filling is about 65–110° F. In still another aspect of this embodiment, the crystals in the mixture are reduced until the temperature of the filling is about 70–100° F. In yet another aspect of this embodiment, the crystals in the mixture are reduced until the temperature of the filling is about 77–95° F. In still another embodiment, the average crystal size of the one or more oils in the filling prior to packaging or applying the filling in and/or onto a food product is less than about 30$\mu$ and that it is desireable that the crystals be in the Beta Prime form. In one aspect of this embodiment, the average crystal size of the one or more oils is about 0.1–10$\mu$. In another aspect of this embodiment, the average crystal size of the one or more oils is about 0.5–8$\mu$. In still another aspect of this embodiment, the average crystal size of the one or more oils is about 1–5$\mu$. It has been found that by reducing the crystal size of the final filling and maintaining a reduced crystal size as the mixture is cooled, a processable final filling is formed which a) does not have a grainy taste or grainy texture, b) can be pumped, poured and/or extruded, c) has a low water activity, d) has desired organoleptic characteristics that are similar to fillings having significantly higher water activities, and e) retains its properties after being thawed or tempered. The process for manufacturing the final filling can be accomplished by a batch or continuous process.

The principal object of the present invention is the provision of a method and formulation, which method and formulation produce a filling having a low water activity.

Another object of the present invention is the provision of a method and formulation which method and formulation is useful for producing a filling which has a high solid content, and has a low water activity.

Still another object of the present invention is the provision of a method and formulation which method and formulation produces a filling having desired organoleptic characteristics.

These and other objects and advantages will become apparent to those skilled in the art upon the reading and following of the description taken together with the accompanied drawings.

BRIEF DESCRIPTION OF THE DRAWINGS

Reference may now be made to the drawings, which illustrate various embodiments that the invention may take in physical form and in certain parts and arrangements of parts wherein.

DETAILED DESCRIPTION OF THE PREFERRED EMBODIMENTS

Figure 1:
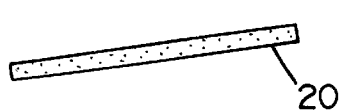
FIG. 1 is a perspective view of an edible oil crystal.

Referring now to the drawings, wherein the showings are for the purpose of illustrating the preferred embodiments of the invention only and not for the purpose of limiting the same, the present invention relates generally to a filling which can be inserted onto or into a food product. Such fillings include fruit fillings, marshmallow fillings, fruit flavored fillings, vegetable fillings, and the like. Typically, uses of the various types of fillings include insertion of the filling into a cracker, wafer, cookie, biscuit, pretzel, donut, muffin, cake, waffle, or the like. The filling is formulated to be stable so that the filling can be packaged for later use, packaged and then frozen for later use, inserted onto and/or into a food casing for immediate or later consumption, and/or inserted onto and/or into a food casing which is frozen and thawed and/or heated for later consumption. The filling is freezer stable so that after it is thawed, the filling does not substantially degrade. The filling is also formulated to have thermal durability. The filling is also formulated to have a low water activity. Heretofore, fillings such as fruit fillings, typically had water activities above about 0.6. Such high water activities for the filling typically resulted in the migration of the water from the filling into a food casing adjacent to or surrounding the filling, thereby resulting in the food casing becoming soggy and/or otherwise becoming unacceptable for consumption. The lower water activity of the filling of the present invention overcomes the problems associated with high water activities of past fillings.

The filling material generally comprises flavoring agents, edible oils and humectant. The flavoring agent typically includes natural and/or artificial flavorings, such as fruit puree, fruit puree concentrate, fruit juice, fruit juice concentration, fruit concentrate, fruit flakes, fruit powder, vegetable puree, vegetable puree concentrate, vegetable juice, vegetable juice concentrate, vegetable pieces, vegetable concentrate, vegetable flakes, vegetable powder, artificial fruit, artificial fruit concentrate, artificial vegetables, artificial vegetable concentrate, dried fruit, dried vegetables, fruit extract, vegetable extract, cocoa, caramel, caramel powder, maple syrup, spices, chocolate, herbs, cheese, and/or flavored oils. Generally, the flavor agent that includes little or no water is added to the filling so as to minimize the water content of the final filling. As can be appreciated, the particular type of flavor agent and/or combination of flavoring agent used in the filling is dependent on the final use of the filling. The flavoring agent is added to the filling in a sufficient amount to provide the desired flavor of the final filling. The edible oil and humectant are added to provide flowability to the filling without the need to add water to the filling. The filling also typically includes, but does not require, sweetener and/or lecithin. The sweetener provides the desired sweetness to the final filling product. The lecithin functions as a emulsifier for the final filling. A general formulation for the filling comprises:

| Filling Material | Percent By Weight |
| --- | --- |
| Flavor Agent | about 0.05–50% |
| Edible Oil | about 0.01–80% |
| Humectant | about 0.1–40% |
| Sweetener | about 1–80% |
| Lecithin | about 0.01–10% |

A more specific formulation of the filling comprises:

| | |
| --- | --- |
| Fruit | 0–25 |
| High Melting Point Oil | 0–2 |
| Low Melting Point Oil | 10–55 |
| Humectant | 10–30 |
| Sweetener | 30–45 |
| Lecithin | 0.1–2 |
| Starch | 1–40 |
| Stabilizer | 0–18 |
| Acidulant | 0.1–2 |
| Flavoring Agent | 0.1–2 |
| Coloring Agent | 0.01–2 |

Various examples of the filling are set forth below:

EXAMPLE I

Strawberry Filling

| Filling Material | Weight Percentage | % Solids |
|---|---|---|
| Strawberry-Apple Flakes | 5.24 | 4.98 |
| Apple Powder | 10 | 10 |
| High Melting Point Oil | 1 | 1 |
| Low Melting Point Oil | 19 | 19 |
| Humectant | 20 | 19.9 |
| Powdered Sweetener | 23.56 | 23.56 |
| Liquid Sweetener | 17.3 | 13.32 |
| Lecithin | 0.2 | 0.198 |
| Instant Modified Starch | 2 | 1.9 |
| Flavored Strawberry | 1 | 0.57 |
| Malic Acid | 0.6 | 0.6 |
| Tater Red | 0.1 | 0.1 |

EXAMPLE II

Marshmallow Filling

| Filling Material | Weight Percentage | % Solids |
|---|---|---|
| Marshmallow | 0.16 | 0.16 |
| Low Melting Point Oil | 20 | 20 |
| Humectant | 20 | 19.9 |
| Powdered Sweetener | 23.69 | 23.69 |
| Liquid Sweetener | 16.4 | 12.63 |
| Lecithin | 0.5 | 0.49 |
| Instant Modified Starch | 2 | 1.9 |
| Instant Natural Starch | 1 | 0.95 |
| Stabilizer | 15 | 14.8 |
| Titanium Dioxide | 1 | 1 |
| Salt | 0.25 | 0.25 |

EXAMPLE III

Orange Filling

| Filling Material | Weight Percentage | % Solids |
|---|---|---|
| Orange Flakes | 5 | 4.8 |
| Apple Powder | 10 | 10 |
| Low Melting Point Oil | 20 | 20 |
| Humectant | 20 | 19.9 |
| Powdered Sweetener | 22.98 | 22.98 |
| Liquid Sweetener | 17.3 | 13.32 |
| Lecithin | 0.5 | 0.49 |
| Instant Modified Starch | 2 | 1.9 |
| Instant Natural Starch | 1 | 0.95 |
| Citric Acid | 0.6 | 0.6 |
| Natural and Artificial Orange Flavoring | 0.5 | 0.15 |
| Yellow Coloring | 0.025 | 0 |
| Titanium Dioxide | 0.1 | 0.1 |

EXAMPLE IV

Blueberry Filling

| Filling Material | Weight Percentage | % Solids |
|---|---|---|
| Blueberry Grape-Apple Flakes | 5.24 | 5.08 |
| Apple Powder | 10 | 10 |
| Low Melting Point Oil | 20 | 20 |
| Humectant | 20 | 19.9 |
| Powdered Fructose | 22.16 | 22.16 |
| Liquid Sweetener | 17.3 | 13.32 |
| Lecithin | 0.5 | 0.49 |
| Instant Modified Starch | 2 | 1.9 |
| Instant Natural Starch | 1 | 0.95 |
| Blueberry | 1 | 0.35 |
| Malic Acid | 0.6 | 0.6 |
| FD&C Purple Shade | 0.1 | 0.1 |
| FD&C Blue 2 | 0.1 | 0.1 |

EXAMPLE V

Grape Filling

| Filling Material | Weight Percentage | % Solids |
|---|---|---|
| Grape-Concord Dried Flakes | 5.24 | 5.08 |
| Apple Powder | 10 | 10 |
| Low Melting Point Oil | 20 | 20 |
| Humectant | 20 | 19.9 |
| Powdered Sweetener | 22.33 | 22.33 |
| Liquid Sweetener | 17.3 | 13.32 |
| Lecithin | 0.5 | 0.49 |
| Instant Modified Starch | 2 | 1.9 |
| Instant Natural Starch | 1 | 0.95 |
| Grape Wonf | 1 | 0.34 |
| Malic Acid | 0.6 | 0.6 |
| Color WJ Blueberry | 0.03 | 0.03 |

EXAMPLE VI

Lemon Filling

| Filling Material | Weight Percentage | % Solids |
|---|---|---|
| Freeze Dried Lemon Powder | 1 | 0.96 |
| Fancy Orange Flakes | 4 | 3.84 |
| Apple Powder | 10 | 10 |
| Low Melting Point Oil | 20 | 20 |
| Humectant | 20 | 19.9 |
| Powdered Sweetener | 22.43 | 22.43 |
| Liquid Sweetener | 17.3 | 13.32 |
| Lecithin | 0.5 | 0.49 |
| Instant Modified Starch | 2 | 1.9 |
| Instant Natural Starch | 1 | 0.95 |
| Citric Acid | 0.6 | 0.6 |
| FD&C Yellow 5 Alum | 0.15 | 0.15 |
| FD&C Yellow Coloring | 0.02 | 0 |
| Titanium Dioxide | 1 | 1 |

EXAMPLE VII

Apple/Cinnamon Filling

| Filling Material | Weight Percentage | % Solids |
| --- | --- | --- |
| Apple Powder | 15.25 | 15.25 |
| Low Melting Point Oil | 20 | 20 |
| Humectant | 20 | 19.9 |
| Powdered Sweetener | 23.40 | 23.40 |
| Liquid Sweetener | 17.3 | 13.32 |
| Lecithin | 0.5 | 0.49 |
| Instant Modified Starch | 2 | 1.9 |
| Instant Natural Starch | 1 | 0.95 |
| Ground Cinnamon | 0.14 | 0.14 |
| Malic Acid | 0.4 | 0.4 |
| Caramel Color | 0.01 | 0.01 |

In the seven examples illustrated above, the percent solids represent the non-water content of the filling. All the above examples have a water content of less than about 6 weight percent and a water activity of less than about 0.5.

Figure 4:
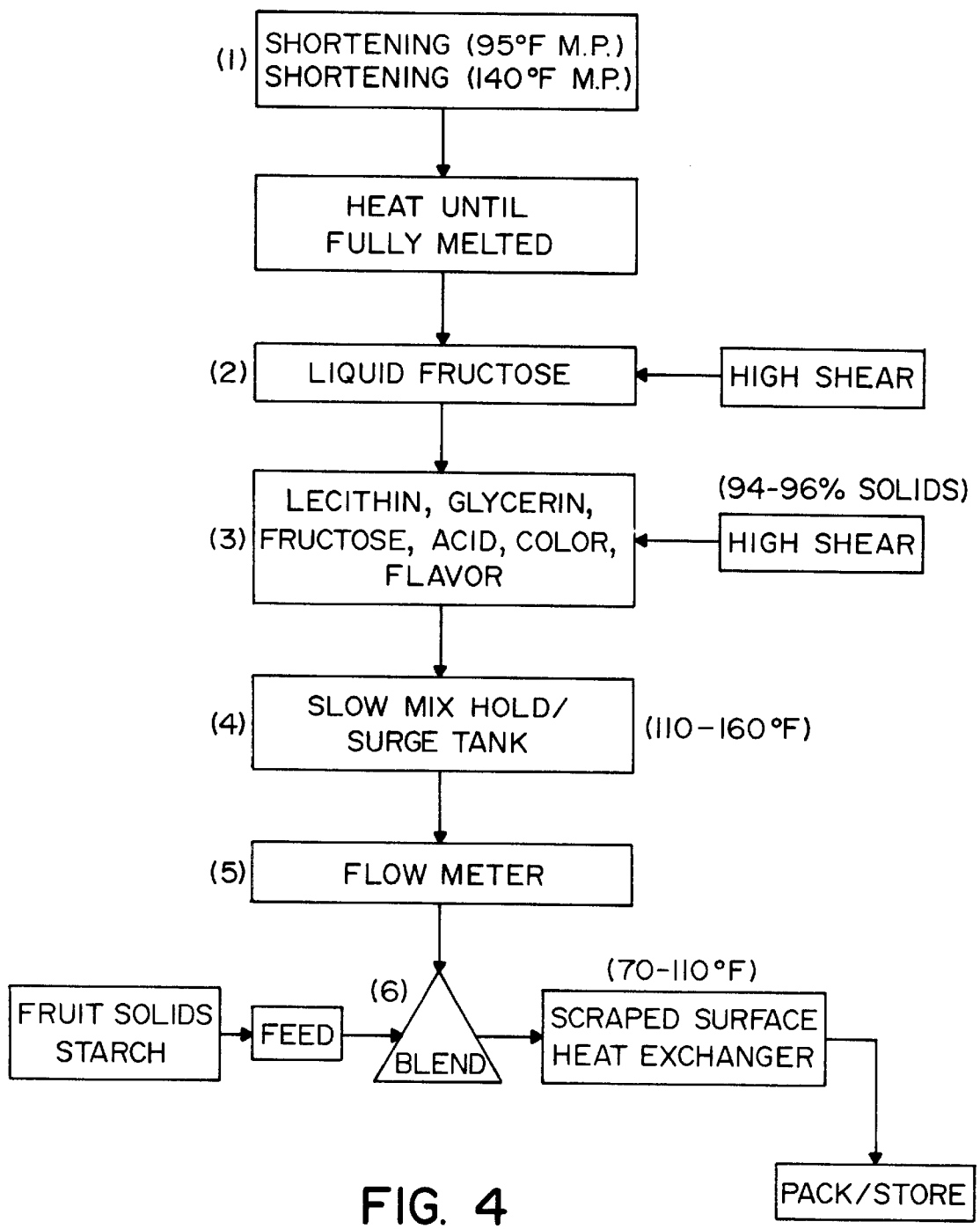
FIG. 4 is a flow chart detailing a continuous process for the manufacturing of the filling.
Figure 9:
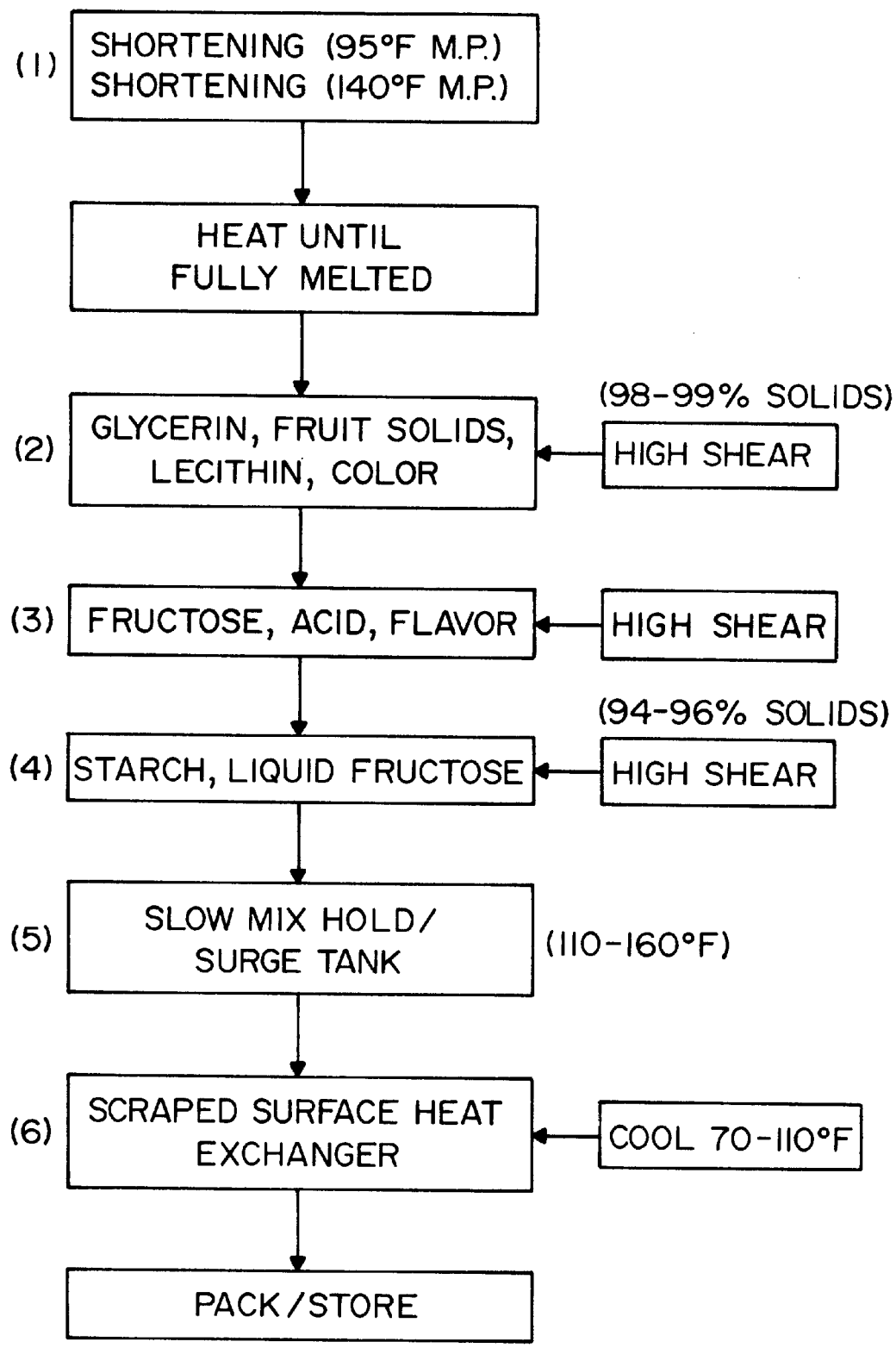
FIG. 9 is a flow chart detailing a batch process for the manufacturing of the filling.

The process for manufacturing the novel filling is illustrated in FIGS. 4 and 9. FIG. 4 illustrates a continuous process for manufacturing the filling. FIG. 9 illustrates a batch process for manufacturing the filling. In both processes, a fruit filling is illustrated; however, non-fruit fillings can be manufactured by both these processes.

Figure 5:
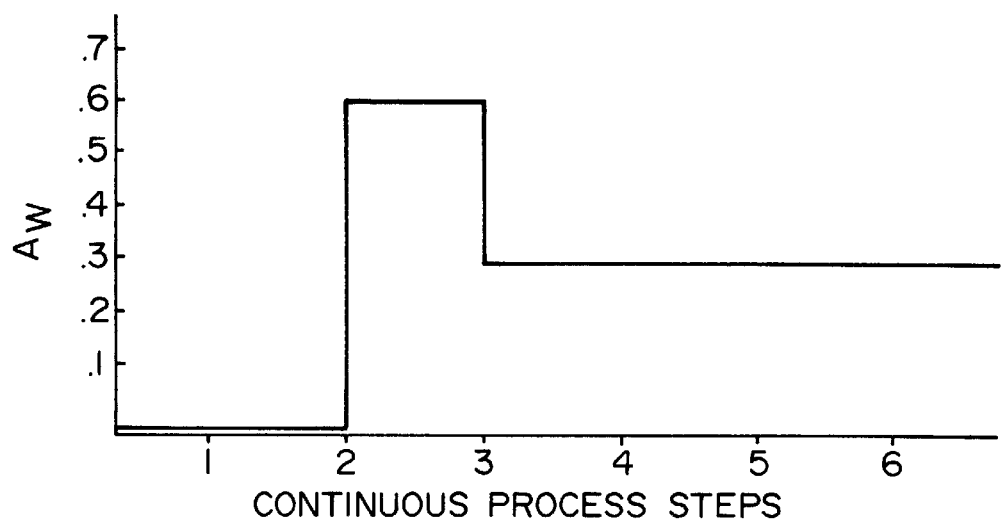
FIG. 5 is a graphical illustration of the water activity of the filling during the continuous process manufacturing of the filling as illustrated in FIG. 4.

Referring now to FIG. 4, the principal process steps are numbered. These numbered process steps correspond to the graphical illustration of the water activity of the filling during manufacture as illustrated in FIG. 5. As shown in FIG. 4, the first process step involves the melting of the one or more edible oils. Step two illustrates the filling including two edible oils or shortenings, one shortening having a melting point of 95° F., referred to as a low melting point oil, and the other shortening has a melting point of 140° F., referred to as a high melting point oil. The two shortenings are heated to a temperature of about 150° F. and mixed together so as to fully melt the two shortenings. At this point of the process, the filling has essentially no moisture and theoretically no $A_w$. Therefore, as shown in FIG. 5, the water activity when the two shortenings are melted together is close to 0.

In step two of the process, liquid fructose is added to the melted shortening and dispersed therein by high shear mixing. The addition of liquid fructose adds fluidity to the mixture. The liquid fructose includes some water in the fructose, typically an 80/20 fructose syrup. As shown in FIG. 5, the addition of liquid fructose to the melted shortening increases the water activity of the filling to about 0.60.

In step three of the process, lecithin, glycerin, dried fructose, acid, coloring agents, and flavoring agents are added to the shortening and liquid fructose mixture. At this step, the water content of the filling is very low as indicated by the overall solids content of 94–96%. As shown in FIG. 5, in step three of the process, the water activity of the mixture decreases to about 0.30. These components are mixed in high shear conditions to disperse the components in the mixture.

In step four of the process, the mixture is held in a surge tank and mixed. The temperature of the mixture is held to about 110–160° F. The cooling of the mixture below the melting point of the high melting point oil results in the high melting point oil to begin to crystallize. FIG. 1 illustrates a typical shortening crystal 20 which forms during step four of the process. Once the high melting point oil begins to crystallize, these crystals act as seeding agents for crystallization of other components in the filling such as, but not limited to, the low melting point oil and the sweetener. As illustrated in FIG. 5, the water activity of the filling does not increase during the mixing of the components.

In step five of the process, the mixture is directed through a flow meter and into a blender as designated by step six. The mixture is blended with fruit solids and starch in step 6. As illustrated in FIG. 5, the water activity remains relatively constant at about 0.30 when the fruit solids and starch are added to the mixture during the blending step. The fruit solids and starch are typically in a powdered or dry state, thus have a low water content so as not to substantially increase the water activity of the filling. The fruit solids and starch are fed into a blender in step six of the process and substantially fully dispersed with the shortening-sweetener mixture. Various types of blenders can be used to blend the components together. Such blenders include, but are not limited to, a triblender or a static blender.

Figure 1A:
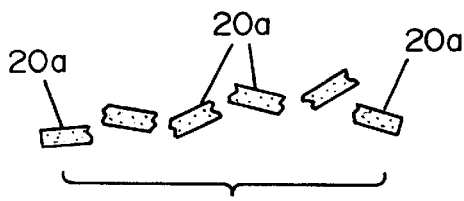
FIG. 1A is a perspective view of a fractured edible oil crystal as shown in FIG. 1.
Figure 2:
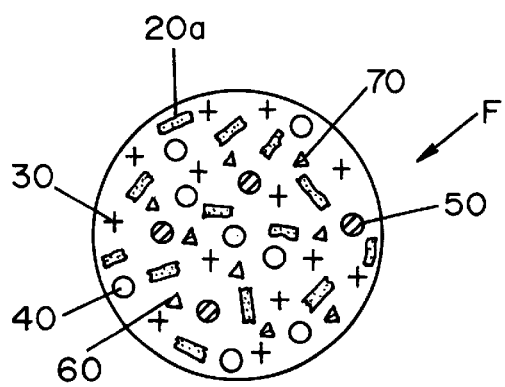
FIG. 2 illustrates a globule of final filling in accordance with the present invention, wherein fractured edible oil crystals are dispersed with various other components of the filling.
Figure 6:
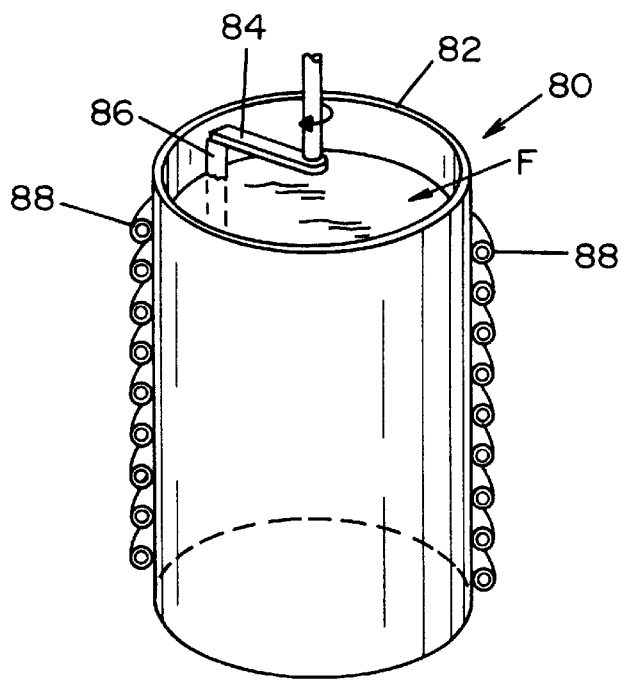
FIG. 6 is a perspective view of a scraped surface heat exchanger.

Once the components are blended together, the mixed components are directed to a scraped surface heat exchanger to further cool the filling components. FIG. 6 illustrates a standard scraped surface heat exchanger 80. Scraped surface heat exchanger 80 includes a container 82, wherein the filling components are directed therein. While the filling components F are maintained in the container 82 of the scraped surface heat exchanger, a rotating arm 84 rotates a scraper blade 86 along the inner surface of container 82. Scraper blade 86 causes the crystals that have formed, or are in the process of forming, in filler F to be fractured. FIG. 1A illustrates the fracturing of a high melting point oil crystal in the scraped surface heat exchanger. Fractured crystals 20a continually grow and become refractured as the mixture is cooled and as scraper blade 86 rotates along the interior surface of container 82. A cooling jacket 88 surrounds the outer surface of container 82 allowing a cooling fluid, such as water, cooling gases, and/or cooling liquids, to pass therethrough. The flow of the cooling fluid through the cooling jacket 88 causes cooling of container 82, which in turn causes the filling components within container 82 to decrease in temperature. The filling components are maintained in the scraped surface heat exchanger until the temperature of the filling component is between about 40–110° F., and typically about 40–100° F., and more typically about 40–90° F. The final crystal size of the shortening in final filling F after the filling is cooled and passed through the scraped surface heat exchanger, it is about 1–30$\mu$, and typically about 1–10$\mu$ and more typically about 1–5$\mu$. FIG. 2 illustrates final filling F which includes fractured shortening 20a dispersed with the fruit solids 30, starch 40, glycerin 50, humectant 60, and fructose 70. The final filling has a water activity of less than about 0.4 and a water content of less than about 5.5 weight percent. This water activity is significantly less than the 0.7 water activity and 25 weight percent water of standard fruit fillings. Although the fruit filling has significantly less water and a significantly lower water activity of standard fruit fillings, the texture, taste, post processability, and other organoleptic characteristics are similar to those of standard fruit fillings.

Referring now to FIG. 9, a batch process for manufacturing the filling is illustrated. The principal process steps are numbered. These numbered process steps correspond to the graphical illustration of the water activity of the filling during manufacture as illustrated in FIG. 9. In the batch process, the high melting point shortening and low melting point shortening are heated during step 1 until fully melted.

Figure 10:
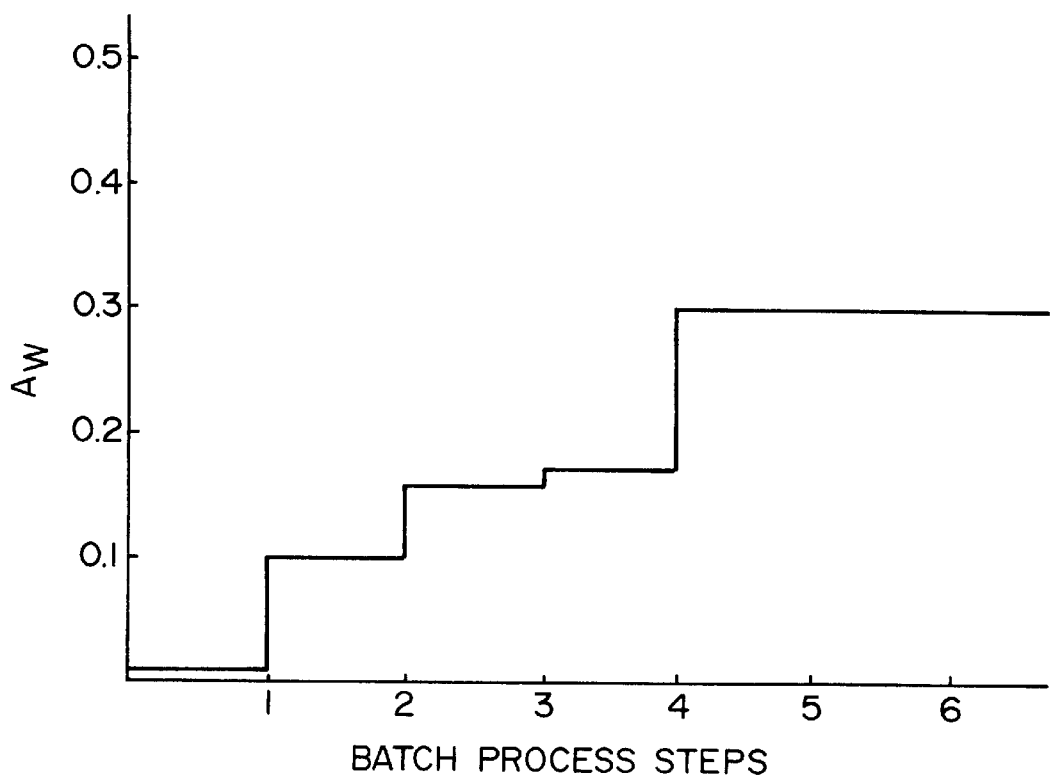
FIG. 10 is a graphical illustration of the water activity of the filling during the batch process manufacturing of the filling as illustrated in FIG. 9.

The water activity of the oils is zero or very close to zero. After the shortenings are melted, glycerin, fruit solids, lecithin, and/or color are mixed with the shortening under high shear mixing conditions in step 2 so as to disperse these components into the melted shortening. The water activity of the mixture increases to about 0.153 during this step. In step 3, powdered fructose, acid and flavoring are then mixed with the other components of the filling under high shear conditions to substantially fully disperse the components of the mixture. The water activity of the mixture slightly increases to about 0.157. Finally, liquid fructose and starch are added to the mixture under high shear conditions in step 4. The liquid fructose and starch are added last to delay starch hydration and premature viscosity build-up of the filling components. The water activity of the mixture increases to about 0.3 during step 4. The mixture is then mixed and held in a surge tank to about 110–160° F. During the cooling process, the high melting point oil begins to crystallize. After the mixture has been held in the surge tank for a sufficient amount of time and tempered to the desired temperature, the mixture is transferred to a scraped surface heat exchanger, wherein the mixture is cooled to a temperature between about 40–110° F. Once the desired crystal size and temperature of the filling is obtained in the scraped surface heat exchanger, the filling is transferred to packaging and stored for later use. Typically, the filling, after being packaged, is stored at ambient room temperature. The water activity of the mixture remains substantially constant during steps 5 and 6. As illustrated in FIGS. 5 and 10, the water activity profile of the mixture is different in a batch or continuous process. However, in both processes, the final water activity of the filling is about 0.3.

Figure 7:
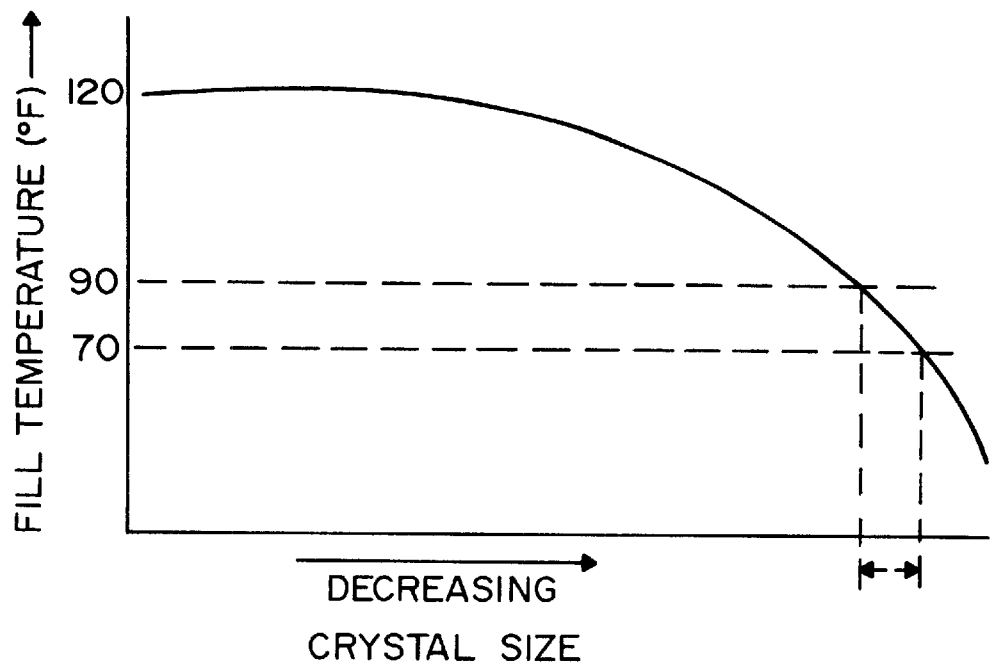
FIG. 7 is a graphical illustration of the crystal size of the one or more edible oils in the filling as a function of the final processing temperature of the filling.
Figure 8:
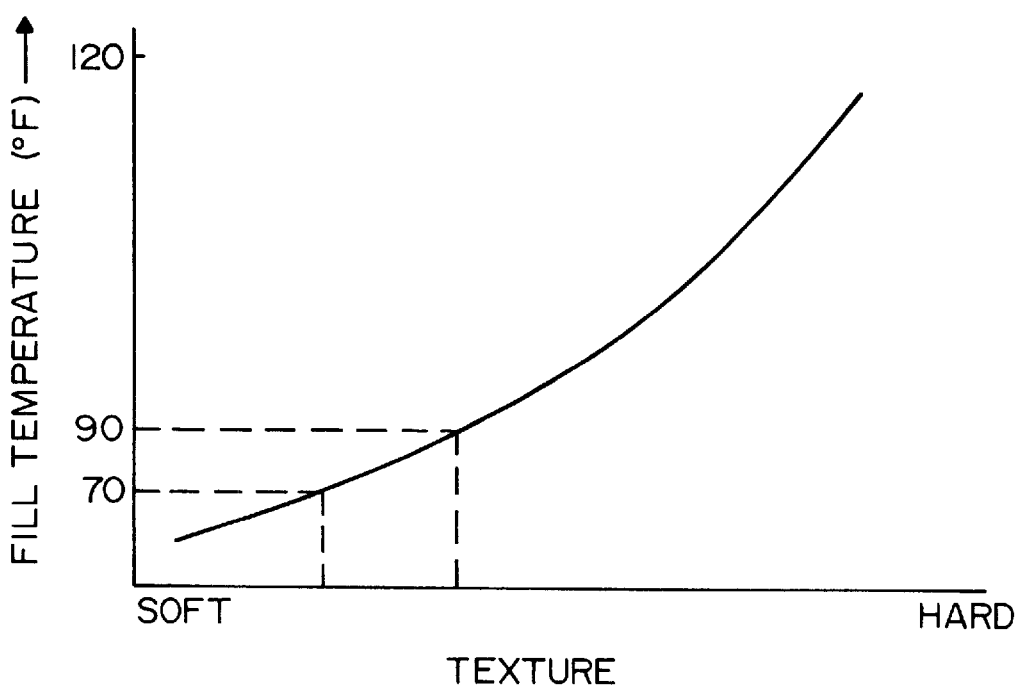
FIG. 8 is a graphical illustration of the texture of the filling as a function of the final processing temperature of the filling.

FIGS. 7 and 8 graphically illustrate the relationship of the crystal size and texture of the filling as a function of the temperature of the filling when it is removed from the scraped surface heat exchanger. As shown in FIG. 7, when the filling is removed from the scraped surface heat exchanger at about 110–120° F., the crystal size of the final filling will be relatively large. When the filling is removed from the scraped surface heat exchanger at a temperature of about 77–90° F., the crystal size of the shortening is substantially smaller. As shown in FIG. 8, a correlation exists between smaller crystal sizes and softer filling textures. Filling having a smaller crystal size and which is removed from the scraped surface heat exchanger at a lower temperature has a smoother texture. Filling having a larger crystal size and which is removed from the scraped surface heat exchanger at a higher temperature has a harder texture. It is believed that when the filling is removed from the scraped surface heat exchanger at temperatures above 110° F., substantial crystal growth continues as the filling cools to or below ambient temperature (70–77° F.). This continued crystal growth results in larger crystals in the final filling and increased textural hardness of the filling. However, it is believed that when the crystals are continually fractured as the filling temperature falls below 110° F., the growth rate of the crystals is significantly less after the filling is removed from the scraped surface heat exchanger and allowed to further cool to or below ambient temperature. Cooling the filling to low temperatures is also believed to help stabilize the final filling. As a result, the final filling has smaller crystals and a softer texture. The use of the high melting point oil as a seed for crystallization causes crystallization of the filler components at higher temperatures, thereby resulting in a more stabilized product after the crystals are fractured which in turn allows the filling to be packaged at higher temperatures and maintain a soft texture with increased stability. It has also been found that when the filling is reheated and cooled, the texture of the filling is not significantly altered. Furthermore, when the filling is cooled to lower temperatures in the scraped surface heat exchanger, significantly less shortening separation from the filling occurs during packaging, storage and reheating, thereby resulting in a more stable filling. The soft textured filling has desired flowability characteristic such that the filling can be easily pumped or extruded for packaging for future use, or be inserted on or into a final food product.

Figure 3:
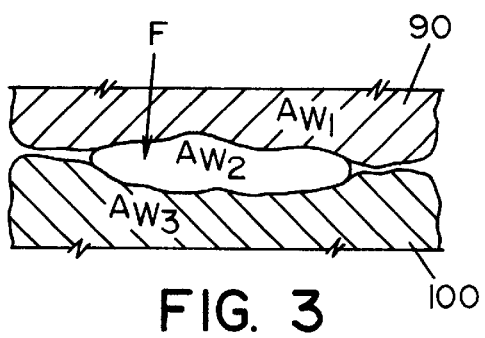
FIG. 3 is a side sectional view of a filled food product containing final filling.

Referring now to FIG. 3, a food product is illustrated, wherein filling F is inserted between two layers of food casing 90, 100. Food casings 90, 100 can constitute a wide variety of food casings such as layers of crackers, cookies, crunchy granola bars, crusts, and the like. As shown in FIG. 3, the water activity of the filling is less than the water activity of food casing layers 90, 100 thus resulting in moisture from filling F not migrating to either food layer 90 or 100. As a result, the low water activity filling F does not cause the boundary between filling F and the food layers to become soggy or to cause degradation of the food casings.

The invention has been described with reference to a preferred embodiment and alternatives thereof. It is believed that many modifications and alterations to the embodiments disclosed will readily suggest itself to the those skilled in the art upon reading and understanding the detailed description of the invention. It is intended to include all such modifications and alterations insofar as they come within the scope of the present invention.

What is claimed is:

1. A fruit flavored filling having a low water activity comprising:
    a) about 0.1–30% by weight fruit;
    b) about 0.01–30% by weight of high melting point oil;
    c) up to about 50% by weight of low melting point oil, said low melting point oil having an average melting point of at least about 10° F. lower than an average melting point of said high melting point oil, said low melting point oil having a higher weight percentage than said high melting point oil;
    d) about 0.1–40% by weight humectant; and
    e) an $A_w$ of less than about 0.8.

2. The fruit flavored filling as defined in claim 1, wherein said fruit comprising fruit puree, fruit puree concentrate, fruit juice, fruit juice concentrate, fruit pieces, fruit concentrate, dehydrated fruit, fruit flakes, fruit powder, and mixtures thereof.

3. The fruit flavored filling as defined in claim 1, wherein said fruit is about 1–25% by weight of said filling.

4. The fruit flavored filling as defined in claim 3, wherein said fruit is about 1–10% by weight of said filling.

5. The fruit flavored filling as defined in claim 3, wherein said fruit is about 5–20% by weight of said filling.

6. The fruit flavored filling as defined in claim 1, wherein said high melting point oil has an average melting point of at least about 110° F.

7. The fruit flavored filling as defined in claim 6, wherein said high melting point oil has an average melting point of at least about 140° F.

8. The fruit flavored filling as defined in claim 7, wherein said high melting point oil has an average melting point of at least about 150° F.

9. The fruit flavored filling as defined in claim 1, wherein said high melting point oil is about 0.01–20% by weight of said filling.

10. The fruit flavored filling as defined in claim 9, wherein said high melting point oil is about 0.05–5% by weight of said filling.

11. The fruit flavored filling as defined in claim 1, wherein said low melting point oil has an average melting point of about 70–120° F.

12. The fruit flavored filling as defined in claim 11, wherein said low melting point oil has an average melting point of about 80–110° F.

13. The fruit flavored filling as defined in claim 1, wherein said low melting point oil is about 5–25% by weight of said filling.

14. The fruit flavored filling as defined in claim 1, wherein the weight percent of said low melting point oil in said filling is at least about three times greater than the weight percent of said high melting point oil in said filling.

15. The fruit flavored filling as defined in claim 1, wherein said humectant is about 1–30% by weight of said filling.

16. The fruit flavored filling as defined in claim 15, wherein said humectant is about 10–25% by weight of said filling.

17. The fruit flavored filling as defined in claim 1, wherein said water activity is less than about 0.7.

18. The fruit flavored filling as defined in claim 1, wherein said water activity is less than about 0.6.

19. The fruit flavored filling as defined in claim 18, wherein said water activity is less than about 0.3.

20. The fruit flavored filling as defined in claim 1, including a water swelling starch.

21. The fruit flavored filling as defined in claim 20, wherein said water swelling starch is about 0.01–15% by weight of said filling.

22. The fruit flavored filling as defined in claim 21, wherein said water swelling starch is about 0.1–5% by weight of said filling.

23. The fruit flavored filling as defined in claim 1, including a sweetener.

24. The fruit flavored filling as defined in claim 23, wherein said sweetener is about 1–80% by weight of said filling.

25. The fruit flavored filling as defined in claim 24, wherein said sweetener is about 10–50% by weight of said filling.

26. The fruit flavored filling as defined in claim 1, including lecithin, said lecithin comprising about 0.01–5% by weight of said filling.

27. The fruit flavored filling as defined in claim 26, said lecithin is about 0.05–2% by weight of said filling.

28. The fruit flavored filling as defined in claim 1, including a natural and/or artificial flavoring, said natural and/or artificial flavoring is about 0.01–20% by weight of said filling.

29. The fruit flavored filling as defined in claim 28, wherein said natural and/or artificial flavoring is about 0.05–5% by weight of said filling.

30. The fruit flavored filling as defined in claim 1, including a stabilizer, said stabilizer is about 0.01–5% by weight of said filling.

31. The fruit flavored filling as defined in claim 1, including salt, said salt is about 0.01–4% by weight of said filling.

32. The fruit flavored filling as defined in claim 1, including an acidulant, said acidulant is about 0.05–5% by weight of said filling.

33. The fruit flavored filling as defined in claim 1, including a coloring agent, said coloring agent is about 0.01–5% by weight of said filling.

34. The fruit flavored filling as defined in claim 1, including a preservative, said preservative is about 0.01–2% by weight of said filling.

35. The fruit flavored filling as defined in claim 1, including vitamins and/or minerals, said vitamins and/or minerals include at least one compound selected from the group consisting of ascorbic acid, beta carotene, biotin, calcium pantothenate, choline, folic acid, niacin, vitamin A, vitamin $B_1$, vitamin $B_2$, vitamin $B_6$, vitamin $B_{12}$, vitamin $D_2$, vitamin $D_3$, niacinamide, vitamin E, vitamin K, boron, calcium, chromium, copper, iodine, iron, magnesium, molybdenum, nickel, potassium, selenium, vanadium, zinc, and mixtures thereof.

36. The fruit flavored filling as defined in claim 1, comprising:
   a) about 10–20% by weight fruit;
   b) about 0.05–2% by weight of high melting point oil;
   c) about 15–25% by weight of low melting point oil;
   d) about 15–25% by weight humectant;
   e) about 0.1–4% by weight water swelling starch;
   f) about 30–50% by weight sweetener;
   g) about 0.05–1% by weight lecithin; and
   h) an $A_w$ of less than about 0.6.

37. The fruit flavored filling as defined in claim 1, comprising:
   a) about 10–20% by weight fruit;
   b) about 0.05–2% by weight of high melting point oil;
   c) about 15–25% by weight of low melting point oil;
   d) about 15–25% by weight humectant;
   e) about 0.1–4% by weight water swelling starch;
   f) about 30–50% by weight sweetener;
   g) about 0.05–1% by weight lecithin; and
   h) an $A_w$ of less than about 0.5.

38. The fruit flavored filling as defined in claim 1, comprising:
   a) about 10–20% by weight fruit;
   b) about 0.05–2% by weight of high melting point oil;
   c) about 15–25% by weight of low melting point oil;
   d) about 15–25% by weight humectant;
   e) about 0.1–4% by weight water swelling starch;
   f) about 30–50% by weight sweetener;
   g) about 0.05–1% by weight lecithin; and
   h) an $A_w$ of less than about 0.3.

39. The fruit flavored filling as defined in claim 1, comprising:
   a) about 12–20% by weight fruit;
   b) about 0.5–1.5% by weight of a high melting point oil;
   c) about 15–22% by weight of a low melting point oil;
   d) about 15–25% by weight humectant;
   e) about 1–4% by weight water swelling starch;
   f) about 30–45% by weight sweetener;
   g) about 0.1–1% by weight lecithin;
   h) about 0–2% by weight fruit flavoring;
   i) about 0.1–1.5% by weight acidulant;
   j) about 0–2% coloring agent; and
   k) an $A_w$ of less than about 0.5.

40. The fruit flavored filling as defined in claim 1, comprising:
   a) about 12–20% by weight fruit;
   b) about 0.5–1.5% by weight of a high melting point oil;
   c) about 15–22% by weight of a low melting point oil;
   d) about 15–25% by weight humectant;
   e) about 1–4% by weight water swelling starch;

f) about 30–45% by weight sweetener;
g) about 0.1–1% by weight lecithin;
h) about 0–2% by weight fruit flavoring;
i) about 0.1–1.5% by weight acidulant;
j) about 0–2% coloring agent; and
k) an $A_w$ of less than about 0.3.

41. A flavored filling having a low water activity comprising:
   a) about 0.05–40% by weight flavor agent;
   b) up to about 50% by weight of a low melting point oil and at least about 0.01% by weight of a high melting point oil, said low melting point oil having an average melting point of up to about 120° F., said high melting point oil having an average melting point of at least about 140° F., said low melting point oil having a higher weight percentage than said high melting point oil;
   c) about 1–40% by weight humectant;
   d) about 1–80% by weight sweetener;
   e) about 0.01–5% by weight lecithin; and
   f) an $A_w$ of up to about 0.7.

42. The flavored filling as defined in claim 41, wherein said flavor agent includes a natural and/or artificial flavorings, said flavor agent including fruit puree, fruit puree concentrate, fruit juice, fruit juice concentrate, fruit pieces, fruit concentrate, fruit flakes, fruit powder, vegetable puree, vegetable puree concentrate, vegetable juice, vegetable juice concentrate, vegetable pieces, vegetable concentrate, vegetable flakes, vegetable powder, artificial fruit, artificial fruit concentrate, artificial vegetable, artificial vegetable concentrate, dried fruit, dried vegetable, fruit extract, vegetable extract, cocoa, caramel, caramel powder, maple syrup, spices, chocolate herbs, flavored oils, and mixtures thereof.

43. The flavored filling as defined in claim 41, wherein said high melting point oil has an average melting point of at least about 150° F.

44. The flavored filling as defined in claim 41, wherein said high melting point oil is about 0.01–30% by weight of said filling.

45. The flavored filling as defined in claim 41, including a water swelling starch, said water swelling starch is about 0.01–15% by weight of said filling.

46. The flavored filling as defined in claim 41, including a stabilizer.

47. The flavored filling as defined in claim 41, including salt.

48. The flavored filling as defined in claim 41, including acidulant, said acidulant is about 0.05–5% by weight of said filling.

49. The flavored filling as defined in claim 41, including a coloring agent, said coloring agent is about 0.01–5% by weight of said filling.

* * * * *